United States Patent

Fournier

[11] Patent Number: 5,143,016
[45] Date of Patent: Sep. 1, 1992

[54] DIAL NEEDLE WITH INDEXED ANGULAR POSITION

[75] Inventor: Joël Fournier, Cergy Saint Christophe, France

[73] Assignee: Societe d'Applications Generales d'Electricite et de Mechanique Sagem, France

[21] Appl. No.: 696,514

[22] Filed: May 7, 1991

[30] Foreign Application Priority Data

May 16, 1990 [FR] France .................. 90 06108

[51] Int. Cl.⁵ ............................................. G01D 13/22
[52] U.S. Cl. ................................... 116/332; 116/328; 116/DIG. 6
[58] Field of Search ......... 116/288, 332, 328, DIG. 6, 116/DIG. 36, 284, 286, 287, 303, 327, 329, 330, 331; 403/2, 13, 289, 383, 361, 354

[56] References Cited

U.S. PATENT DOCUMENTS

| 2,257,979 | 10/1941 | Rubinstein | 403/289 X |
| 2,301,169 | 11/1942 | Engstrom | 403/361 X |
| 3,057,647 | 10/1962 | Wood | 403/2 |
| 3,182,345 | 5/1965 | Smith | 403/361 X |
| 3,340,762 | 9/1967 | Bennett | 403/2 X |
| 4,697,949 | 10/1987 | Perez | 403/361 |
| 4,723,504 | 2/1988 | Griffin et al. | 116/332 |
| 4,973,188 | 11/1990 | Glover et al. | 403/361 X |
| 5,003,914 | 4/1991 | Mayer | 116/328 X |

FOREIGN PATENT DOCUMENTS

| 2062968 | 8/1971 | Fed. Rep. of Germany | 403/2 |
| 3343861 | 6/1985 | Fed. Rep. of Germany | 116/288 |
| 3435377 | 9/1985 | Fed. Rep. of Germany | 116/328 |
| 3628539 | 3/1988 | Fed. Rep. of Germany | |
| 2594540 | 9/1987 | France | 116/328 |
| 1556284 | 11/1979 | United Kingdom | 116/328 |
| 2157800 | 10/1985 | United Kingdom | 403/14 |

Primary Examiner—William A. Cuchlinski, Jr.
Assistant Examiner—John L. Beres
Attorney, Agent, or Firm—Rosenman & Colin

[57] ABSTRACT

A dial needle is mounted on a drive shaft of a measuring instrument. The needle includes a body and a support, both mounted on the drive shaft. The body and the support are initially connected in a one-piece construction in which the body is spaced axially from the support. Upon axially moving the body along the shaft to the support, weakened zones break, thereby detaching the body from the support. A pointer on the body is angularly turnable to an indexed position by a peripheral projection and a complementary recess provided on the support and the body.

7 Claims, 1 Drawing Sheet

DIAL NEEDLE WITH INDEXED ANGULAR POSITION

BACKGROUND OF THE INVENTION

1. Field of the Invention

The present invention relates to a dial needle with indexed angular position, for mounting on the output shaft of a drive element of a measuring instrument, comprising a body with a pointer and a holding foot adapted to be fixed to the shaft for rotational and translational movements, by one of its sides, the body being adapted for fixing removably to the shaft for translational movement and indexed in angular position on the holding foot, by its other side.

A dial needle is intended to be driven by an element of an instrument measuring a physical magnitude, which element is itself driven with a movement representative of the value of this magnitude, in front of a dial carrying divisions of a graduation, for indicating the value of this magnitude. Generally, such a needle is mounted on the shaft of a rotary motor.

It will be readily understood that calibration of the motor and of the measuring instrument must be carried out with the needle mounted on the motor and before the dial of the instrument is in position, after fixing, to an instrument panel. Subsequent adjustment of the motor and of the instrument must moreover take place under the same conditions. Since the needle must be removed for fixing the dial to the instrument panel, that means that after fixing the dial the needle may take up its angular calibrated and adjusted position.

2. Description of the Prior Art

A dial needle of the above mentioned type is known from the document FR-A-86 02153. Its needle body may be separated from the holding foot after calibration then re-positioned in the initial angular indexation. Indexing of the needle body on the holding foot is here achieved by keying on a portion of the foot which is asymmetric with respect to the axis of the shaft. More precisely, the keying portion of the holding foot comprises two resilient tongues disposed on each side of this axis and having teeth for fixing the needle body on the holding foot for translational movement.

The needle of document FR-A-86 02153, apart from the fact that its accuracy leaves much to be desired because of the arrangement, with respect to the axis of the holding foot, of the tongues for indexing and fixing the needle body for translational movement is relatively difficult to produce.

The document GB-A-1 556 284 also teaches a dial needle, of a type closely related to that mentioned above, not in two but in three parts. Furthermore, these parts are even more difficult to manufacture than those of the preceding document and fixing of the holding foot for rotation on the output shaft and the angular indexing of the needle body are here obtained by means which are just as complex such as a pawl or a spring mounted ball.

SUMMARY OF THE INVENTION

The present invention therefore provides a dial needle which is simple to manufacture and easy to use.

For this, it relates to a needle body of the above type, characterized by the fact that it is in one piece and the needle body and the holding foot are fixed detachably together.

With the invention, since the needle is in one piece, its management, storage and handling, before being mounted on the measuring instrument, are considerably simplified. Because of its one-piece character, the needle of the invention may further be made from an injected plastic material from a single mold, which is a guarantee of correct matching of the needle body and the holding foot and so of the indexing quality.

At the time of fitting the needle on the measuring instrument, fixing of the holding foot and of the needle body to the output shaft of the drive element detaches the needle body from the holding foot before the body is indexed on the foot.

In an advantageous embodiment of the needle of the invention, the needle body comprises indexing means on the holding foot carried by a holding leg extending the body and adapted for removably fixing the body for translational movement to the shaft. Thus, fixing of the body to the shaft for translational movement takes place directly, like that of the foot, which forms another guarantee of the indexing quality.

Again advantageously, the needle body and the holding foot are fixed together by detachable attachments on one or other of the two body and foot elements and the attachments are resilient and adapted for participating in fixing the body to the shaft for translational movement.

In a preferred embodiment of the needle of the invention, the needle body and the holding foot comprise exclusively peripheral indexing means, namely off-centered with respect to the axis of the output shaft of the drive element.

Because of that the relative angular positioning of the needle body and of the holding foot is particularly accurate which further adds to the indexing quality.

BRIEF DESCRIPTION OF THE DRAWINGS

The invention will be better understood from the following description of a preferred embodiment of the dial needle, with reference to the accompanying drawings in which.

DESCRIPTION OF THE PREFERRED EMBODIMENT

Figure 1:
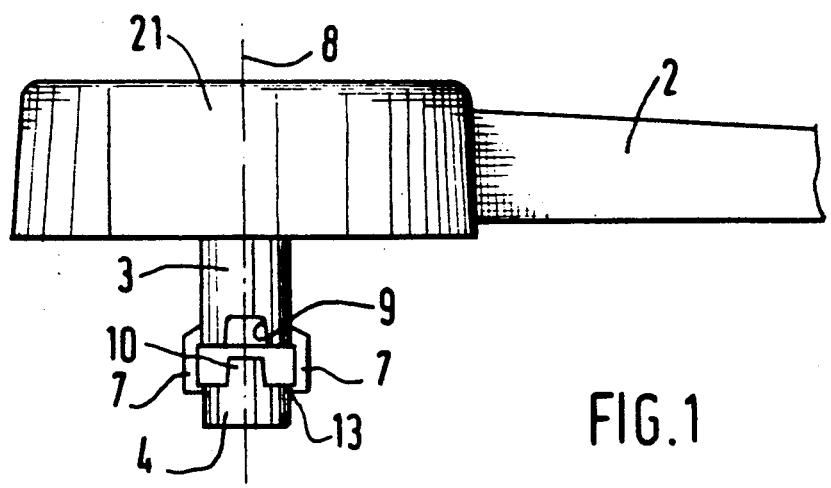
FIG. 1 is an overall side view of the needle of the invention, before use thereof.

The needle, which will now be described, comprises a body 1 with a pointer 2 and extended, here perpendicularly to the pointer, by a holding leg 3 and a holding foot 4. The needle is intended to be mounted on an output shaft 5 of a drive element 6 of a measuring instrument, not shown. Before use, body 1 and foot 4 are fixed together by small attachments 7, here two in number. The holding leg 3 and the holding foot 4 are tube portions with axis 8.

The needle, made from a plastic material, has been formed by injection in a single mold. It is in one piece. The holding leg 3 and the holding foot 4 are perfectly matched, having been formed in identical injection conditions. The holding foot 4 has an internal diameter slightly less than the diameter of shaft 5 so as to be able to be force fitted on the shaft and fixed there for rotational and translational movement. The holding leg 3 has an internal diameter also slightly less than the diameter of shaft 5, but very slightly greater than that of the foot, so as to be fitted also directly on shaft 5 and be there fixed for translational movement, but with lesser clamping force than that of the foot, so that leg 3, and so body 1, can be detached relatively easily from shaft 5.

The needle body 1, here its holding leg 3, and the holding foot 4 comprise mutual rotational indexing means 9, 10 respectively. These are peripheral means formed in the thickness of their tubular wall. From the free annular end 11 of the holding leg 3, turned towards the holding foot 4, an indentation 9 is formed shaped so as to receive a tooth 10 projecting from the annular end 12, turned towards the holding leg 3, of foot 4.

In the state of the needle removed from the manufacturing mold, the needle body 1, with its holding leg 3 and the holding foot 4 are spaced apart from each other by the attachments 7 connected to leg 3, slightly short of end 11, and to foot 4 substantially in the plane of end 12. The length of the attachments 7 is here very slightly greater than the axial dimension of foot 4. They are connected to the holding foot 4, here by a zone 13 of low mechanical strength, in any case lower than that of their zone 15 connected to the holding leg 3.

The needle is fitted on shaft 5 by first of all fitting foot 4 then leg 3. When bringing leg 3 closer to foot 4, the zones 13 of attachments 7 break, or are detached from the foot. By further drawing leg 3 and foot 4 closer together, the attachments 7 slide along foot 4, until the joint planes 11 and 12 merge and tooth 10 is perfectly engaged in indentation 9, in the position indexing leg 3 on foot 4. It will be noted that the attachments 7 are slightly offset from the leg 3 at the level of their zone 15 connected to leg 3, for providing a clearance 14 between them and the side wall of foot 4, and that the end 16 of these attachments, freed during fitting on shaft 5, is shaped so as to grip the circular edge 17 of foot 4, opposite its joint plane 12 and, because of the relative resilience of the attachments, participate in fixing the needle body axially to shaft 5.

It will be noted that from the plane of the edge 17 of the holding foot 4 there is formed an inner bell-mouth shape or chamfer facilitating fitting of the foot on shaft 5.

In the above described embodiment of the needle of the invention, the indexing means are formed by a tooth on the foot and an indentation on the leg. This arrangement could of course be reversed. Furthermore, several pairs of teeth-indentations could perfectly well be provided suitably spaced apart angularly.

The essential thing is the peripheral arrangement of the teeth and the indentations, distant from axis 8 so as to obtain very good indexing accuracy.

Mounting of the needle will now be described.

The holding foot 4 and the holding leg 3 of the needle body 1 are fitted on shaft 5 as far as the indexed position. The measuring instrument being in the rest state, for example, the holding foot is rotated on the shaft, with body 1, until the pointer 2 is perfectly opposite the division of the graduation of the dial of the measuring instrument corresponding to this rest state. Then the needle body 1 and its leg 3 are withdrawn from shaft 5, the foot remaining on shaft 5, the instrument then being correctly adjusted. The dial of the instrument is fixed, for example, to the instrument panel of a vehicle, and leg 3 of body 1 is again fitted on shaft 5, as far as the angular indexed position.

Figure 2:
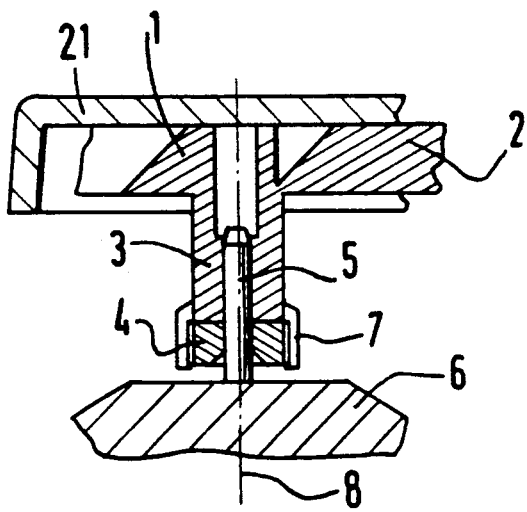
FIG. 2 is a sectional view of the needle of FIG. 1, in the position of use.
Figure 3:
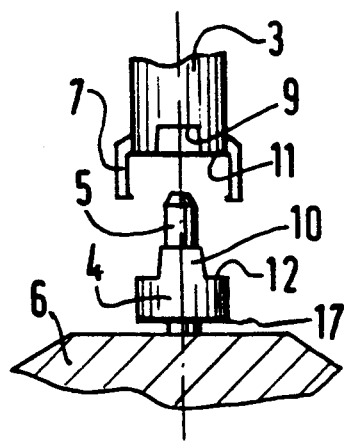
FIG. 3 is a view of the indexing means of the needle, the body and the foot being detached from each other.
Figure 4:
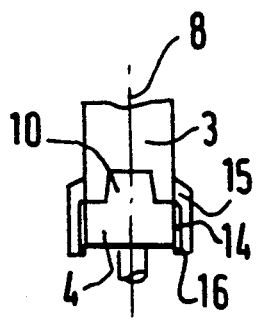
FIG. 4 is a view of the indexing means of FIG. 3, in the indexation position.
Figure 5:
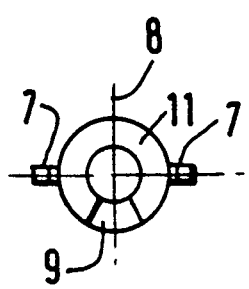
FIG. 5 is an end view of the holding leg of the needle body.

Referring to FIGS. 1 and 2 it will be noted that in this embodiment the needle body 1 and its pointer 2 are shaped so as to receive a mask in the form of a button 21.

What is claimed is:

1. A measuring instrument dial needle for mounting on a drive shaft that extends along a shaft axis, said needle comprising:
   (a) a body having a pointer extending radially of the shaft axis, and an interior axially-extending passage into which the shaft is inserted for joint turning movement about the shaft axis, said body being axially movable along the shaft;
   (b) a support having an interior axially-extending passageway through which the shaft is inserted for joint turning movement about the shaft axis; and
   (c) detachable connector means for integrally connecting the support and the body in a one-piece construction in which the body is spaced axially away from the support, said detachable connector means including weakened zones for detaching the body from the support upon axial movement of the body along the shaft to the support.

2. The needle as claimed in claim 1, wherein the detachable connector means includes a pair of elongated connectors in a common plane at opposite sides of the shaft axis.

3. The needle as claimed in claim 2, wherein the body has an axial end face, and wherein each connector has one end attached to the body and extends axially past the end face.

4. The needle s claimed in claim 3, wherein the support has a pair of end surfaces facing respectively toward and away from said axial end face of the body, and wherein each connector has an opposite end engaging the end surface facing away from said axial end face.

5. The needle as claimed in claim 1, wherein the body, the pointer, the support and the detachable connector means are constituted of molded, resilient, synthetic plastic material.

6. The needle as claimed in claim 1; and further comprising indexing means for adjustably positioning the pointer at an indexed position angularly relative to the shaft axis, said indexing means including a peripheral projection and a peripheral recess, each extending axially parallel to the shaft axis.

7. The needle as claimed in claim 6, wherein the projection and recess are formed respectively on and in the support and the body, said projection being received in the recess upon said axial movement of the body along the shaft to the support.

* * * * *